United States Patent
Adachi et al.

(10) Patent No.: US 8,213,713 B2
(45) Date of Patent: Jul. 3, 2012

(54) IMAGE PROCESSING APPARATUS AND COMPUTER READABLE MEDIUM

(75) Inventors: Shintaro Adachi, Ebina (JP); Toshiyuki Yamada, Ebina (JP); Nobuo Inoue, Tokyo (JP); Tsutomu Kimura, Minamiashigara (JP); Minoru Sodeura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 461 days.

(21) Appl. No.: 12/570,078

(22) Filed: Sep. 30, 2009

(65) Prior Publication Data

US 2010/0246942 A1    Sep. 30, 2010

(30) Foreign Application Priority Data

Mar. 27, 2009    (JP) .................. 2009-078038

(51) Int. Cl.
*G06K 9/34*    (2006.01)
(52) U.S. Cl. .................. 382/164; 382/162; 382/166
(58) Field of Classification Search ............... 382/166, 382/162, 164, 173; 348/256, 262, 645, 255; 358/505, 515, 1.9, 3.23, 518, 500; 257/232, 257/258
See application file for complete search history.

(56) References Cited

U.S. PATENT DOCUMENTS

| 6,836,564 B2 * | 12/2004 | Katayama et al. | 382/166 |
| 7,355,749 B2 * | 4/2008 | Nishide et al. | 358/1.9 |
| 7,884,977 B2 * | 2/2011 | Mori | 358/505 |

FOREIGN PATENT DOCUMENTS

| JP | 07-236062 A | 9/1995 |
| JP | 2003-244447 A | 8/2003 |
| JP | 2005-269271 A | 9/2005 |
| JP | 2005-323066 A | 11/2005 |
| JP | 2008-288912 A | 11/2008 |

OTHER PUBLICATIONS

Notification of Reasons for Refusal issued Dec. 8, 2010 in counterpart Japanese Application No. 2009-078038.

* cited by examiner

*Primary Examiner* — Anh Hong Do
(74) *Attorney, Agent, or Firm* — Sughrue Mion, PLLC

(57) ABSTRACT

An image processing apparatus is provided, the image processing apparatus including: a limited color conversion processing section that extracts plural pieces of color information constructing image information and converts the plural pieces of color information into color information representing specific colors to which each of the plural pieces of color information belongs; a by-color separation processing section that separates the image information containing the converted color information for each of the specific colors; a compression determination section that determines a compression system for each color as to each of pieces of image information which are separated by the by-color separation processing section for each of the specific colors; a compression processing section that compresses said each of pieces of image information according to the determined compression system for each color; and a layered structure forming processing section that collectively outputs said each of pieces of image information compressed.

11 Claims, 18 Drawing Sheets

FIG. 18

|  | JBIG2 APPLIED TO ALL LAYERS | MMR APPLIED TO ALL LAYERS | EXEMPLARY EMBODIMENT |
|---|---|---|---|
| COMPRESSION SIZE | 40K BYTES | 60K BYTES | 43K BYTES |
| COMPRESSION PROCESSING TIME | 1.2 SEC | 0.09 SEC | 0.68 SEC |

IMAGE PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2009-078038 filed Mar. 27, 2009.

BACKGROUND

1. Technical Field

This invention relates to an image processing apparatus and a computer readable medium.

2. Related Art

In recent years, it has been a general practice to scan a paper document with a digital multiple function device, etc., and electronically retain or distribute the document. At the time, large amounts of documents are stored electronically or are transferred using a communication line and thus it is desirable that the file size per document should be small.

To lessen the file size, data may be compressed at high compressibility; however, if the compressibility is made high, degradation of the image quality occurs.

SUMMARY

According to an aspect of the present invention, there is provided an image processing apparatus, including:

a limited color conversion processing section that extracts plural pieces of color information constructing image information and converts the plural pieces of color information into color information representing specific colors to which each of the plural pieces of color information belongs;

a by-color separation processing section that separates the image information containing the color information converted to represent the specific colors by the limited color conversion processing section for each of the specific colors;

a compression determination section that determines a compression system for each color as to each of pieces of image information, said each of pieces of image information being separated by the by-color separation processing section for each of the specific colors;

a compression processing section that compresses said each of pieces of image information for each of the specific colors according to the compression system for each color determined by the compression determination section; and a layered structure forming processing section that collectively outputs said each of pieces of image information for each of the specific colors compressed by the compression processing section.

BRIEF DESCRIPTION OF THE DRAWINGS

Exemplary embodiments of the present invention will be described in detail based on the following figures, wherein:

FIG. 18 is a drawing to show an example of the compression size and the processing time of a file when the embodiment is applied.

DETAILED DESCRIPTION

Figure 1:
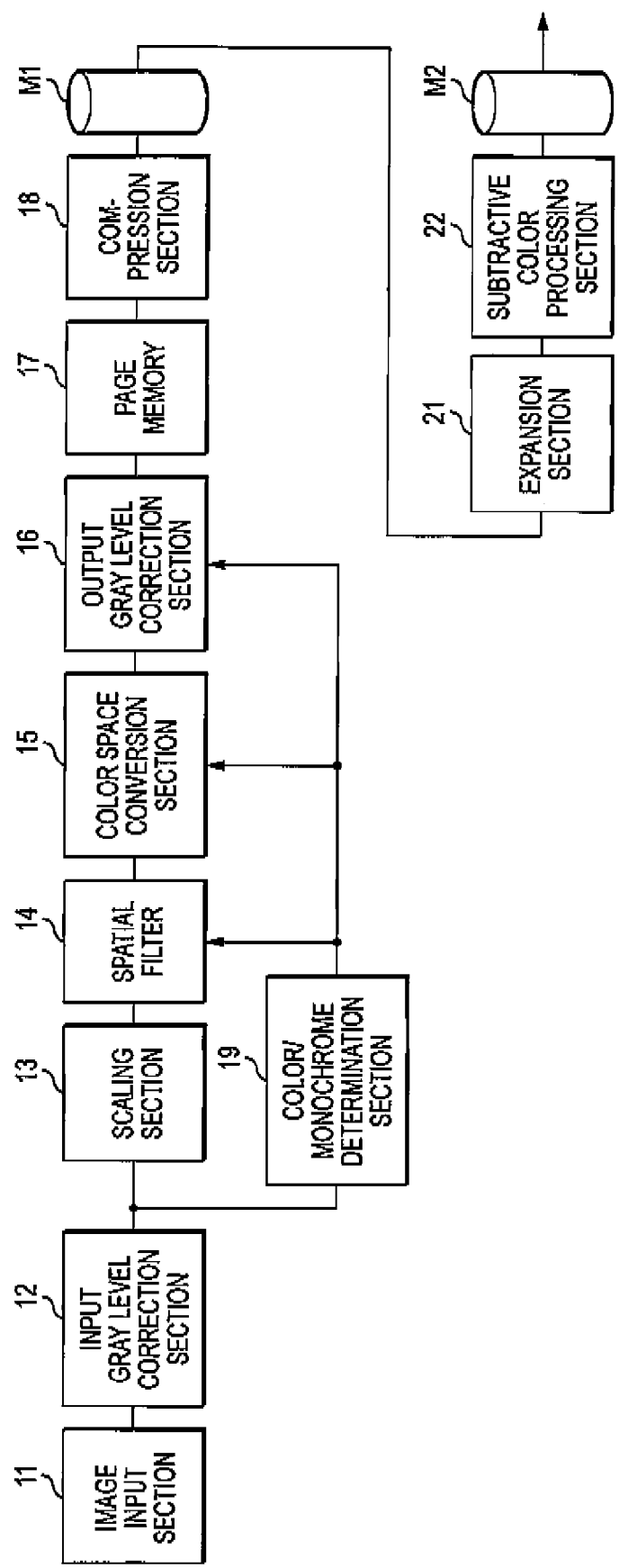
FIG. 1 is a block diagram to describe the general configuration of an image processing apparatus according to an embodiment of the invention.

The best mode for carrying out the invention (which will be hereinafter referred to as "embodiment") will be discussed below in the following order:

1. General configuration of image processing apparatus
2. Configuration of subtractive color processing section
3. Configuration of limited color conversion processing section
4. Configuration of by-color separation processing section
5. Specific examples of processing of compression processing determination section
6. Configuration of another image processing apparatus
7. Specific examples of processing of compression processing determination section according to another configuration
8. Image processing program
9. Compression size and processing time according to the embodiment <1. General Configuration of Image Processing Apparatus>

FIG. 1 is a block diagram to describe the general configuration of an image processing apparatus according to an embodiment of the invention. In the description of the embodiment, as the image processing apparatus, a digital multiple function device is taken as an example, but the image processing apparatus according to the embodiment is not limited to the digital multiple function device and is also applied to any other device such as photographing with a digital camera (for example, whiteboard mode, etc.).

The image processing apparatus includes an image input section 11, an input gray level correction section 12, a scaling section 13, a spatial filter 14, a color space conversion section 15, an output gray level correction section 16, page memory 17, a compression section 18, a first storage section M1, a color/monochrome determination section 19, a expansion section 21, a subtractive color processing section 22, and second storage section M2.

The image input section 11 acquires electronic data of an image to be processed. For example, it may be a scanner for acquiring electronic data of an image from a document or may be a section for acquiring electronic data transmitted from an external computer, etc., through a network.

The input gray level correction section 12 is a section for correcting gray level in the electronic data of the image acquired in the image input section 11. For example, it makes a gray level correction based on a predetermined tone curve.

The scaling section 13 performs processing of scaling up or down the electronic data of the image in response to a predetermined enlargement ratio or reduction ratio. The spatial filter 14 filters the electronic data of the image using a predetermined spatial filter. For example, a predetermined spatial filter is applied to the electronic data of the image and processing of MTF (Modulation Transfer Function) correction, etc., responsive to the characteristic of the spatial filter (for example, noise removal, smoothing processing, enhancement processing) is performed.

The color space conversion section 15 is a section for converting a color space representing the electronic data of the image (pixel value). For example, it performs processing of converting RGB color space into YCbCr color space. The output gray level correction section 16 is a section for making a gray level correction matched with the characteristic of an output unit. The page memory 17 is a section for temporarily retaining the electronic data of the image in page units.

The compression section 18 is a section for compressing the electronic data of the image according to a predetermined compression system (for example, JPEG (Joint Photographic Experts Group)). The first storage section M1 is a section for retaining the compressed image data. For example, a hard disk drive is used as the first storage section M1.

The color/monochrome determination section 19 is a section for determining whether the image is a color image or a monochrome (single color) image based on the electronic data of the image acquired in the image input section 11. The determination result is reflected on the spatial filter 14, the color space conversion section 15, and the output gray level correction section 16.

The expansion section 21 performs processing of expanding the compressed image data stored in the first storage section M1. The subtractive color processing section 22 performs processing of decreasing color to specific color for the electronic data of the image expanded in the expansion section 21. The subtractive color processing section 22 is one of the characteristic portions of the image processing apparatus of the embodiment and is described later in detail.

The second storage section M2 is a section for storing the image data after the subtractive color processing. For example, a hard disk drive is used as the second storage section M2. The second storage section M2 may share the device with the first storage section M1. The image data subjected to the subtractive color processing stored in the second storage section M2 is sent to the outside through the network.

<2. Configuration of Subtractive Color Processing Section>

Figure 2:
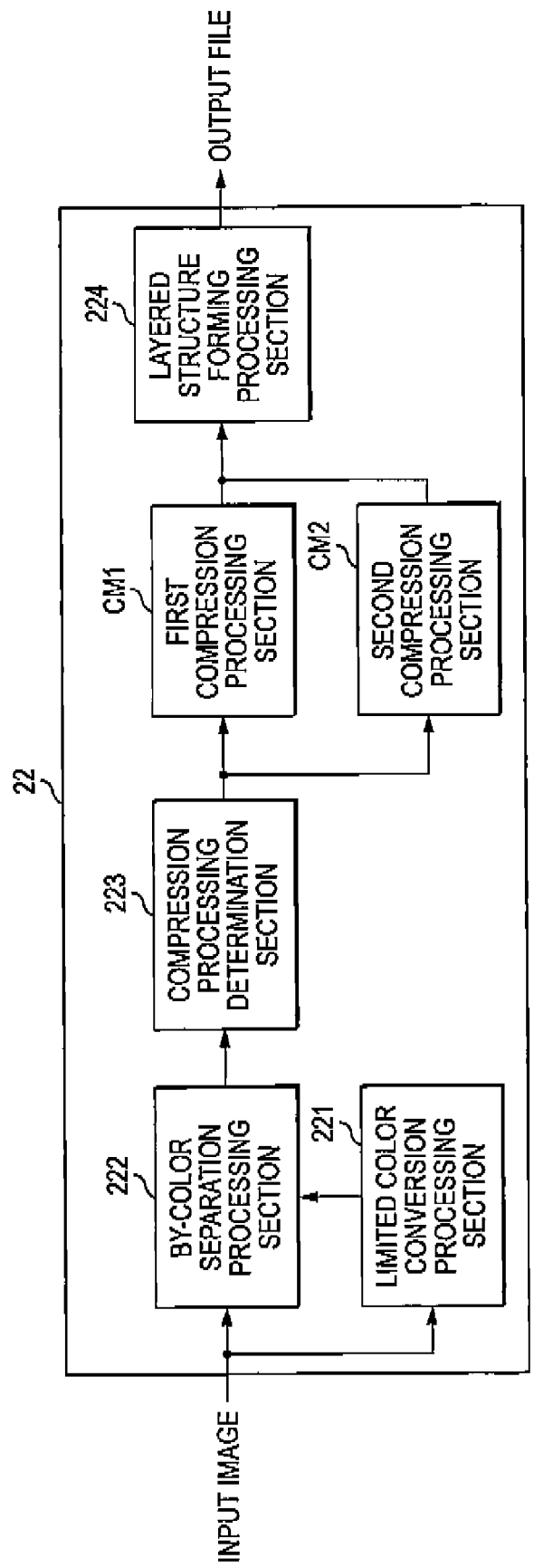
FIG. 2 is a block diagram to describe the configuration of a subtractive color processing section.

FIG. 2 is a block diagram to describe the configuration of the subtractive color processing section. The subtractive color processing section 22 includes a limited color conversion processing section 221, a by-color separation processing section 222, a compression processing determination section 223, a layered structure forming processing section 224, and plural compression processing sections (in the example in FIG. 2, a first compression processing section CM1 and a second compression processing section CM2).

The limited color conversion processing section 221 extracts plural pieces of color information making up an image from an input image (electronic data of the image sent from the expansion section 21 shown in FIG. 1) and converts the plural pieces of color information into color information representing specific color to which the extracted color information belongs. In the following description, "color" means a color represented by color information. The limited color conversion processing section 221 is described later in detail.

The by-color separation processing section 222 performs processing of separating the post-converted data converted into plural colors by the limited color conversion processing section 221 to image data for each color.

The compression processing determination section 223 performs processing of determining a compression system for each color about image information for each specific color provided by the by-color separation processing section 222.

The first compression processing section CM1 and the second compression processing section CM2 of the plural compression processing sections perform compression processing for each data piece by color about plural pieces of image data separated by color in the by-color separation processing section 222. Different compression systems are applied to the first compression processing section CM1 and the second compression processing section CM2. Which of the first compression processing section CM1 and the second compression processing section CM2 is to be used is determined by determination of the compression processing determination section 223. In the embodiment, the two compression processing sections of the first compression processing section CM1 and the second compression processing section CM2 are used by way of example, but three or more compression processing sections may be used.

The layered structure forming processing section 224 performs processing of collecting image data by color compressed by the first compression processing section CM1 and the second compression processing section CM2 into one file for output. The output file is once stored in the second storage section M2 shown in FIG. 1 and then is sent through the network.

<3. Configuration of Limited Color Conversion Processing Section>

Figure 3:
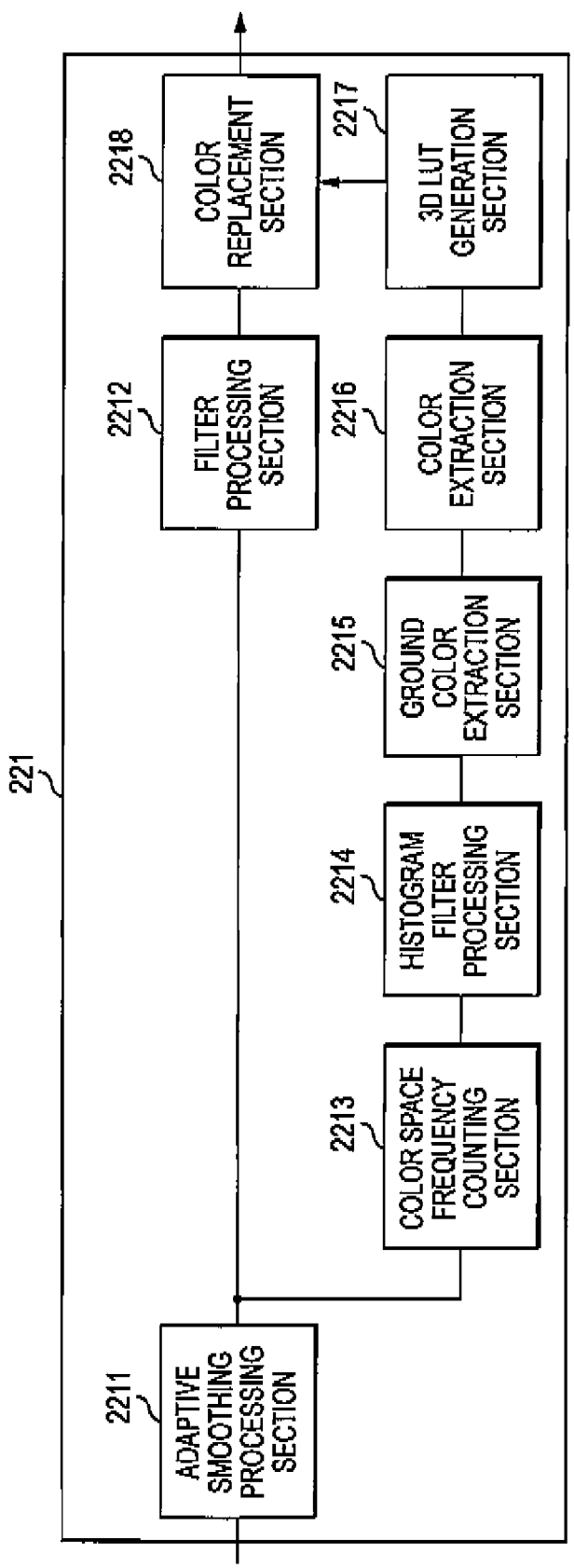
FIG. 3 is a block diagram to describe the configuration of a limited color conversion processing section.

FIG. 3 is a block diagram to describe the configuration of the limited color conversion processing section. The limited color conversion processing section 221 includes an adaptive smoothing processing section 2211, a filter processing section 2212, a color space frequency counting section 2213, a histogram filter processing section 2214, a ground color extraction section 2215, a color extraction section 2216, a 3D UT generation section 2217, and a color replacement section 2218.

The adaptive smoothing processing section 2211 is a section for performing smoothing processing of an input image (electronic data of the image sent from the expansion section 21 shown in FIG. 1) to remove noise from the electronic data of the input image.

The filter processing section 2212 is a section for performing enhancement processing for the electronic data of the image after subjected to the smoothing processing using 5×5 filters, for example.

Figure 4:
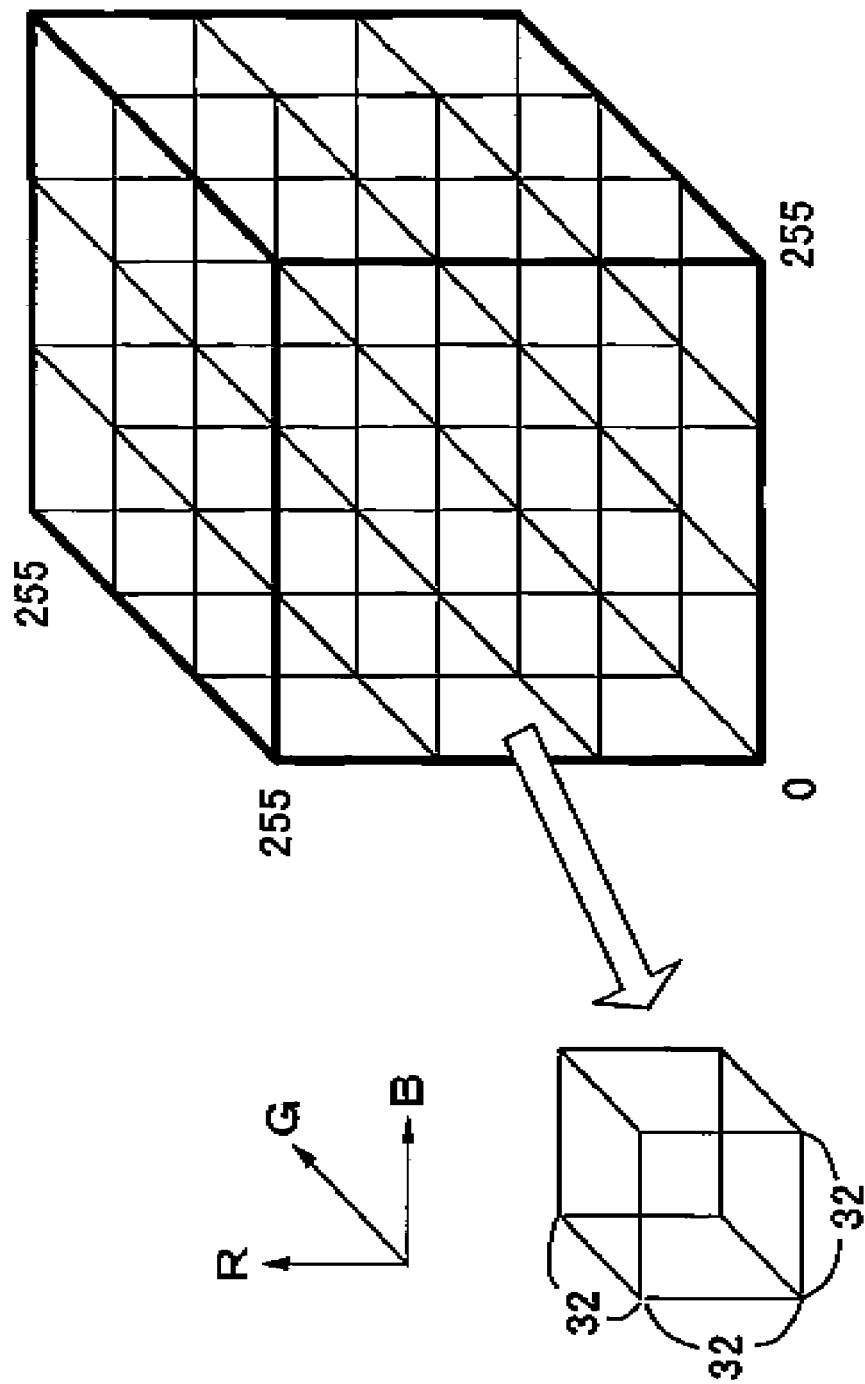
FIG. 4 is a schematic drawing to describe area splitting of color space.

The color space frequency counting section 2213 performs processing of counting the occurrence frequency (histogram) of pixel value about the electronic data of the image after subjected to the smoothing processing. Histogram generation of the color space frequency counting section 2213 will be discussed. FIG. 4 is a schematic drawing to describe area splitting of color space. To generate a histogram, the color space frequency counting section 2213 splits a three-dimensional color space in the electronic data of the image into predetermined areas and counts the frequency for each split area.

As shown in FIG. 4, for example, if the gray level values that can be taken in an RGB color space are 0 to 255, the gray level values of each of R, G, and B are divided into eight equal groups every 32 gray levels. Accordingly, the RGB color space is split into 8×8×8=512 areas. The color space frequency counting section 2213 counts the frequency for each of the 512 split areas. The split units are shown byway of example and are set as required.

The histogram filter processing section 2214 shown in FIG. 3 is a section for filtering processing of extracting only histograms for split areas exceeding a predetermined frequency about the histogram for each split area counted by the color space frequency counting section 2213. The histogram filter processing section 2214 extracts the peak of the histogram using a three-dimensional second derivative filter.

The ground color extraction section 2215 performs processing of extracting the ground color (color of ground surface) of image data based on the histogram filtered by the histogram filter processing section 2214. For example, it extracts the color having the highest frequency as the ground color among candidate colors becoming a preset ground color. Various methods of ground color extraction processing are applied.

The color extraction section 2216 performs processing of extracting a specific color (representative color) from among the peaks of the histograms filtered and extracted by the histogram filter processing section 2214. Specifically, first, a color lower than preset saturation is excluded from among the extracted peaks (peak colors) of the histograms. Next, black is determined from the remaining peak colors.

Next, a representative color is selected from among the remaining peak colors. To select the representative color, for example, a color having a feature amount of hue, etc., deviating from the feature amount a preset predetermined amount or more is selected. The number of representative colors is set so as not to exceed the preset upper limit. That is, the representative colors are selected so as not to exceed the upper limit number of colors in the descending order of the frequency among the colors selected as the representative colors.

The 3D LUT generation section 2217 generates a 3D LUT (three-dimensional lookup table) for replacing color with the representative color extracted by the color extraction section 2216. That is, the 3D LUT associates the predetermined pixel value range of image data and the selected representative color with each other. Accordingly, each pixel value of the image data is converted into the specific representative color associated with the range to which the pixel value belongs.

The color replacement section 2218 performs processing of replacing each pixel value of the image data with any representative color using the 3D LUT generated by the 3D LUT generation section 2217. Accordingly, the image data is decreased to the representative color.

<4. Configuration of By-Color Separation Processing Section>

Figure 5:
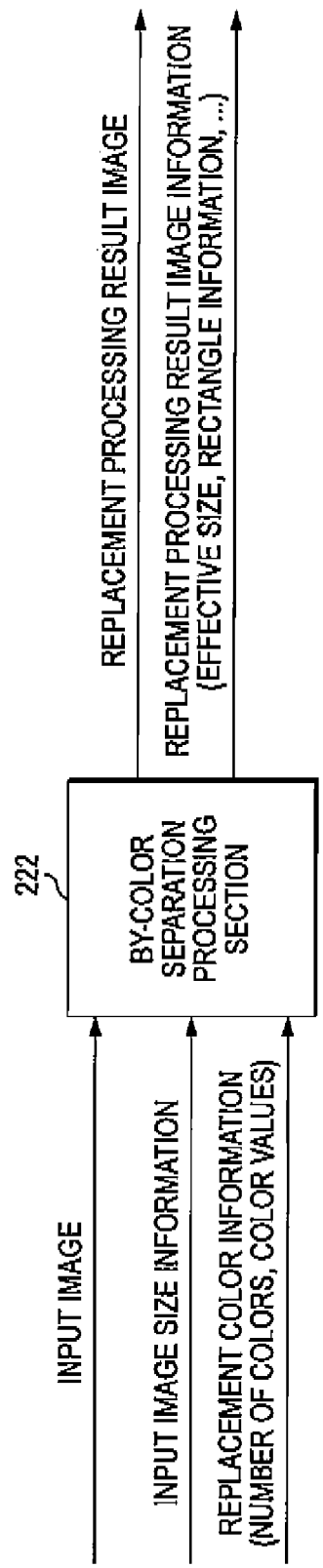
FIG. 5 is a drawing to describe the configuration of a by-color separation processing section.

FIG. 5 is a drawing to describe the configuration of the by-color separation processing section. The input image (electronic data of the image sent from the expansion section 21 shown in FIG. 1), size information of the input image, and replacement color information (number of colors, color values) output from the limited color conversion processing section are input to the by-color separation processing section 222. The by-color separation processing section 222 separates data as data of a layered structure for each representative color based on the input information and outputs a result image. It also outputs information of the result image of the layered structure (effective size, rectangle information, etc.).

Figure 6:
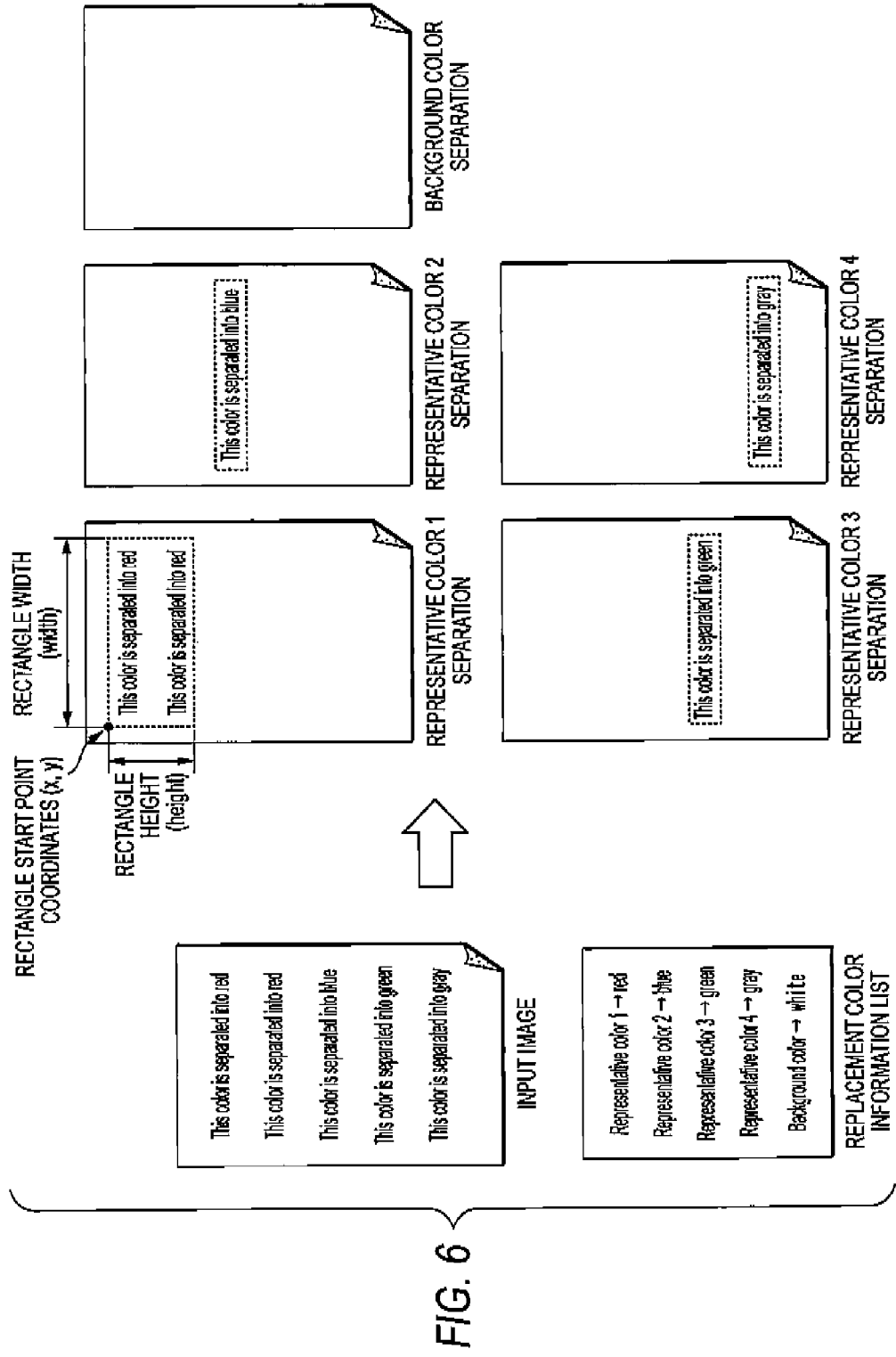
FIG. 6 is a schematic drawing to describe data separation of the by-color separation processing section.

FIG. 6 is a schematic drawing to describe the data separation of the by-color separation processing section. The by-color separation processing section separates the image data replaced with the representative color for each representative color and sets data of layered structure. The data of the layered structure includes data provided by converting the pixel value of each pixel for each representative color into a binary value (which may be a multiple value) and information of a circumscribed rectangle containing the pixel of the representative color, namely, information of the start point coordinates, the rectangle height, and the rectangle width of the circumscribed rectangle within a page.

In the example shown in FIG. 6, four colors of "red," "blue," "green," and "gray" are selected as the representative colors and data is separated for each of the representative colors and is output as data of a layered structure. The data of each pixel of each representative color is converted into a binary value.

In addition to the representative colors, a background color is also output as data of a layered structure. Data of the background color includes the color value of the background color and information indicating a background. The background is specified for the whole page and thus need not have rectangle information. Like the data of the representative color, the background color may be allowed to have rectangle information (in this case, rectangle information of whole page). Accordingly, it becomes a data structure where the representative color and the background color are not discriminated.

Information separated as data of layered structure for each representative color and background color by the by-color separation processing section 222 is compressed for each data of layered structure by either of the first compression processing section CM1 and the second compression processing section CM2 shown in FIG. 2. The compression processing determination section 223 determines which compression processing section compresses the information in response to the feature of the data for each color. Information need not be compressed in a structure where the color value of the background color and information indicating a background are included.

The layered structure forming processing section 224 shown in FIG. 2 performs processing of collecting the data of layered structure of the compressed representative color and background color into one file as the data format of layered structure and outputting the file. For example, MRC (Mixed Raster Content) can be named as the data format of layered structure.

<5. Specific Examples of Processing of Compression Processing Determination Section>

Specific examples of processing of the compression processing determination section will be discussed below: The specific examples described here take the case where the two compression processing sections of the first compression processing section CM1 and the second compression processing section CM2 are used as plural compression processing sections and MMR (Modified Modified Read) is used as the compression system of the first compression processing section CM1 and JBIG2 (Joint Bi-level Image Experts Group 2) to provide higher compression than that of the compression system of the first compression processing section CM1 is used as the compression system of the second compression processing section CM2.

[Features Common to Specific Examples]

In image processing apparatus of the embodiment, for example, in a digital multiple function device, etc., for scanning a document with a small number of colors added to black characters and electronically retaining the document, the electronic data is limited to specific colors and layer separation is executed for each color and binary compression is executed for each layer. At this time, the compression system to be applied for each color is determined and compression for each color is executed using the determined compression system. Accordingly, image quality degradation is suppressed and high speed and high compressibility are provided in reading of a document with a small number of colors, such as a drawing with a small number of colors entered in black characters (rubric, etc.,), for example.

SPECIFIC EXAMPLE (No. 1)

Figure 7:
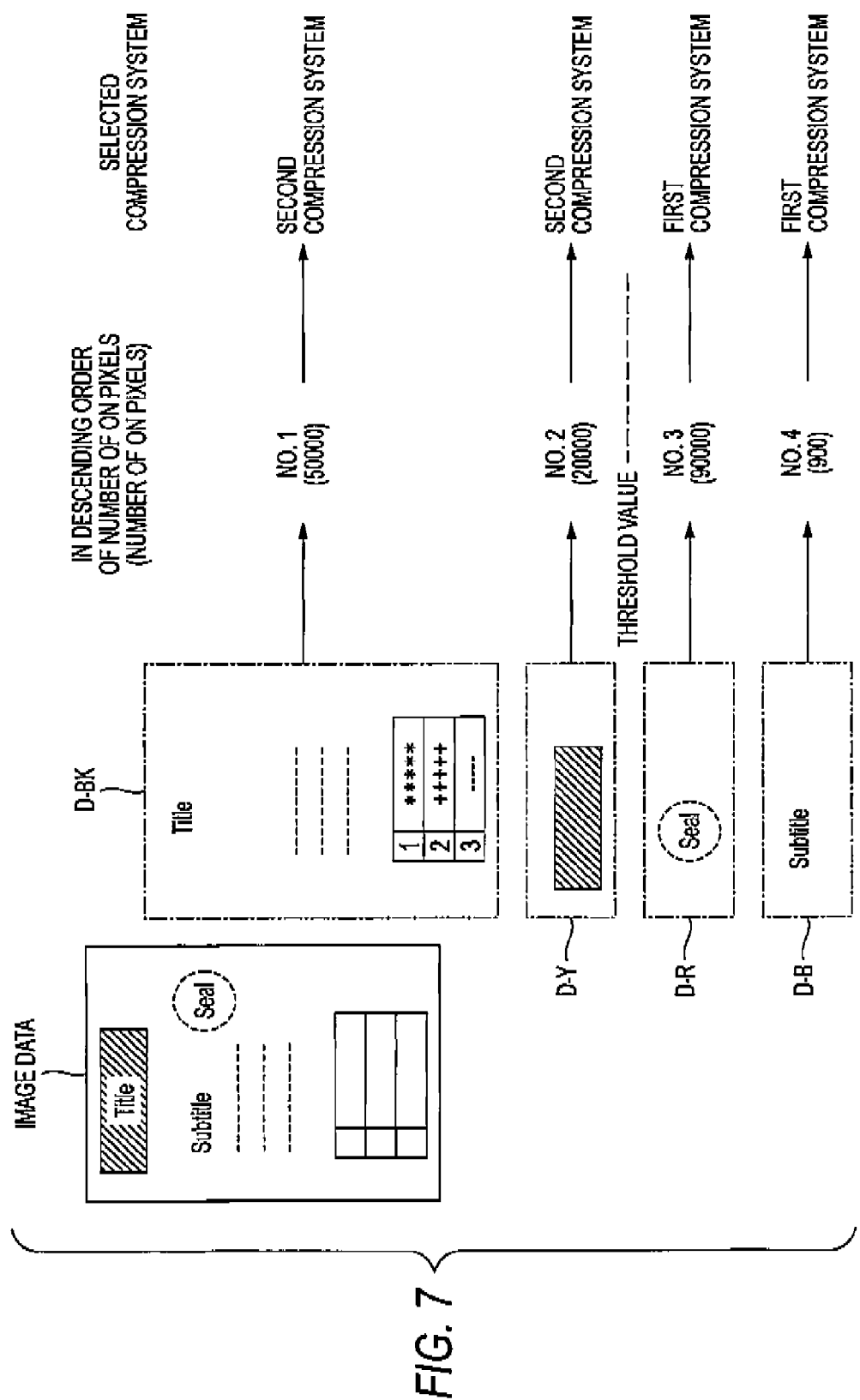
FIG. 7 is a drawing to describe a specific example (No. 1) of processing of a compression processing determination section.

FIG. 7 is a drawing to describe a specific example (No. 1) of processing of the compression processing determination section. The specific example is predicated on the configuration of the subtractive color processing section 22 shown in FIG. 2. The compression processing determination section 223 counts the number of ON pixels (pixels each with the pixel value greater than or equal to a given threshold value; ditto for the following) for each color about the data of layered structure for each representative color sent from the by-color separation processing section 222. The compression processing determination section 223 assigns a number to the data of layered structure in the descending order of the number of ON pixels.

In the example shown in FIG. 7, black layered structure data D-BK, yellow layered structure data D-Y, red layered structure data D-R, and blue layered structure data D-B are sent to the compression processing determination section 223 as the data of layered structure for each representative color obtained from image data. By way of example, the number of ON pixels of the black layered structure data D-BK is 50000, that of the yellow layered structure data D-Y 20000, that of the red layered structure data D-R is 9000, and that of the blue layered structure data D-B is 900.

The compression processing determination section 223 assigns a number to the layered structure data in the descending order of the number of ON pixels. In the example, the black layered structure data D-BK becomes No. 1, the yellow layered structure data D-Y becomes No. 2, the red layered structure data D-R becomes No. 3, and the blue layered structure data D-B becomes No. 4.

Next, the compression processing determination section 223 determines the compression system of the layered structure data for each color using a preset number or the number of ON pixels as a threshold value. In the example shown in FIG. 7, the order No. 2 or the number of ON pixels, 20000, is used as the threshold value and the different compression system is determined depending on whether the order number or the number of ON pixels is greater than or equal to or is less than the threshold value.

Specifically, the compression system of each of the black layered structure data D-BK and the yellow layered structure data D-Y becoming greater than or equal to the threshold value is determined the second compression system (second compression processing section), and the compression system of each of the red layered structure data D-R and the blue layered structure data D-B becoming less than the threshold value is determined the first compression system (first compression processing section).

In the example, since the second compression system is JBIG2 and the first compression system is MMR, the black layered structure data D-BK and the yellow layered structure data D-Y becoming greater than or equal to the threshold value are compressed according to JBIG2 and the red layered structure data D-R and the blue layered structure data D-B becoming less than the threshold value are compressed according to MMR.

That is, the second compression system (JBIG2) which becomes high compressibility between the first and second compression systems is adopted for the layered structure data with the number of ON pixels greater than or equal to the threshold value because the file size for all layers becomes large. On the other hand, the first compression system (MMR) which becomes low compressibility between the first and second compression systems is adopted for the layered structure data with the number of ON pixels less than the threshold value because the file size for all layers becomes small. Accordingly, the whole file size is lessened and the processing speed is increased.

In the specific example (No. 1) described above, the number of ON pixels of the layered structure data of each color is counted and each number is assigned to the data of layered structure in the descending order of the number of ON pixels. However, the number of OFF pixels (pixels each with the pixel value less than a given threshold value; ditto for the following) of the layered structure data of each color may be counted and each number may be assigned in the ascending order of the number of OFF pixels.

SPECIFIC EXAMPLE (No. 2)

Figure 8:
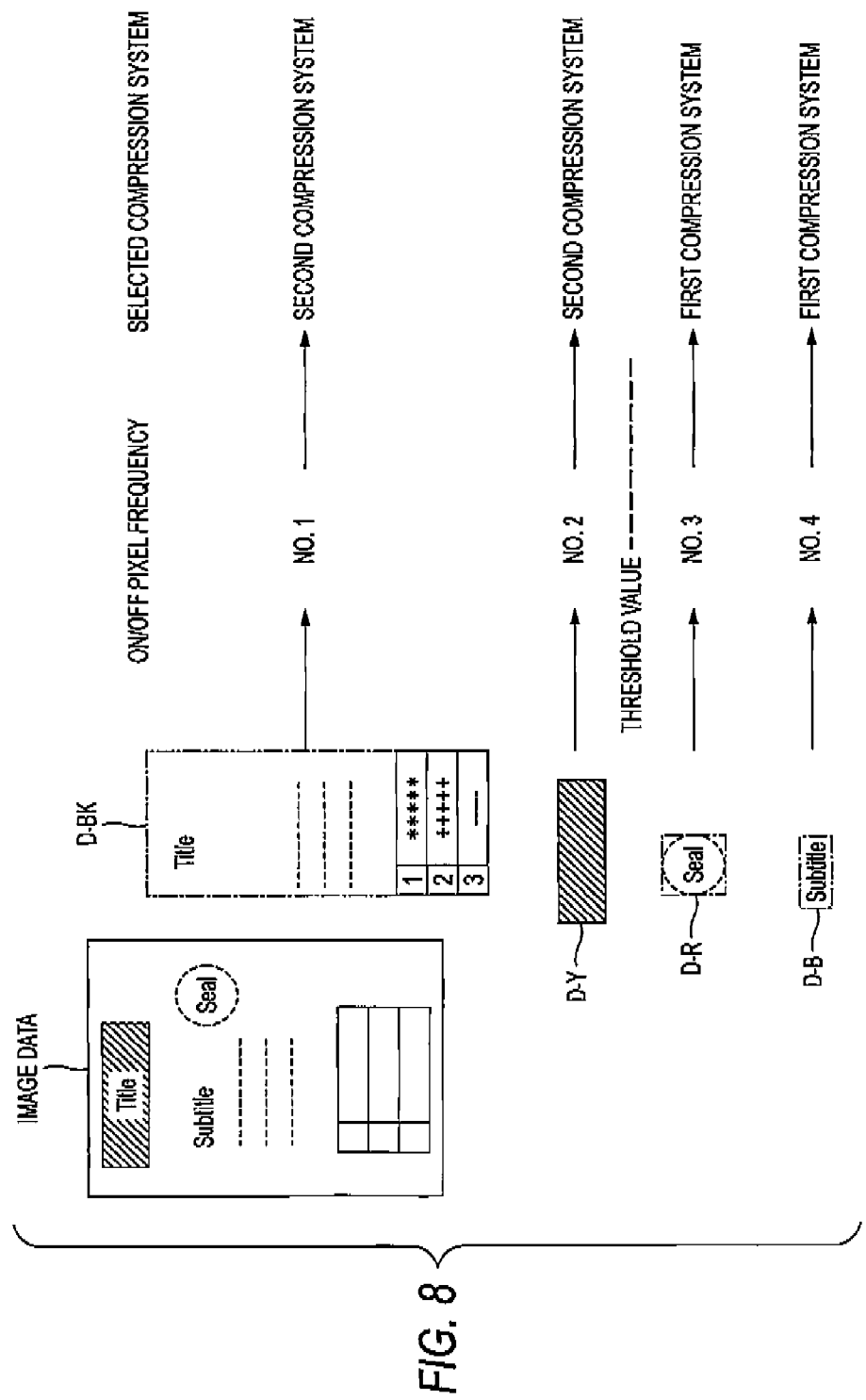
FIG. 8 is a drawing to describe a specific example (No. 2) of processing of the compression processing determination section.

FIG. 8 is a drawing to describe a specific example (No. 2) of processing of the compression processing determination section. The specific example is predicated on the configuration of the subtractive color processing section 22 shown in FIG. 2. The compression processing determination section 223 computes the frequency of switch between ON and OFF pixels for each color about the data of layered structure for each representative color sent from the by-color separation processing section 222. The compression processing determination section 223 assigns a number to the data of layered structure in the descending order of the frequencies.

In the example shown in FIG. 8, black layered structure data D-BK, yellow layered structure data D-Y, red layered structure data D-R, and blue layered structure data D-B are sent to the compression processing determination section 223 as the data of layered structure for each representative color obtained from image data.

The compression processing determination section 223 assigns a number to the layered structure data in the descending order of the frequencies of switch between ON and OFF pixels. In the example, the black layered structure data D-BK becomes No. 1, the yellow layered structure data D-Y becomes No. 2, the red layered structure data D-R becomes No. 3, and the blue layered structure data D-B becomes No 4.

Next, the compression processing determination section 223 determines the compression system of the layered structure data for each color using a preset number or frequency as a threshold value. In the example shown in FIG. 8, the order No. 2 is used as the threshold value and the different compression system is determined depending on whether the order number is greater than or equal to or is less than the threshold value.

Specifically, the compression system of each of the black layered structure data D-SK and the yellow layered structure data D-Y becoming greater than or equal to the threshold value is determined the second compression system (second compression processing section), and the compression system of each of the red layered structure data D-R and the blue layered structure data D-B becoming less than the threshold value is determined the first compression system (first compression processing section).

In the example, since the second compression system is JBIG2 and the first compression system is MMR, the black layered structure data D-SK and the yellow layered structure data D-Y becoming greater than or equal to the threshold value are compressed according to JBIG2 and the red layered structure data D-R and the blue layered structure data D-B becoming less than the threshold value are compressed according to MMR.

That is, the second compression system (JBIG2) which becomes high compressibility between the first and second compression systems is adopted for the layered structure data where the frequency of switch between ON and OFF pixels is high because the file size for all layers becomes large. On the other hand, the first compression system (MMR) which becomes low compressibility between the first and second compression systems is adopted for the layered structure data where the switch frequency is low because the file size for all layers becomes small. Accordingly, the whole file size is lessened and the processing speed is increased.

SPECIFIC EXAMPLE (No. 3)

Figure 9:
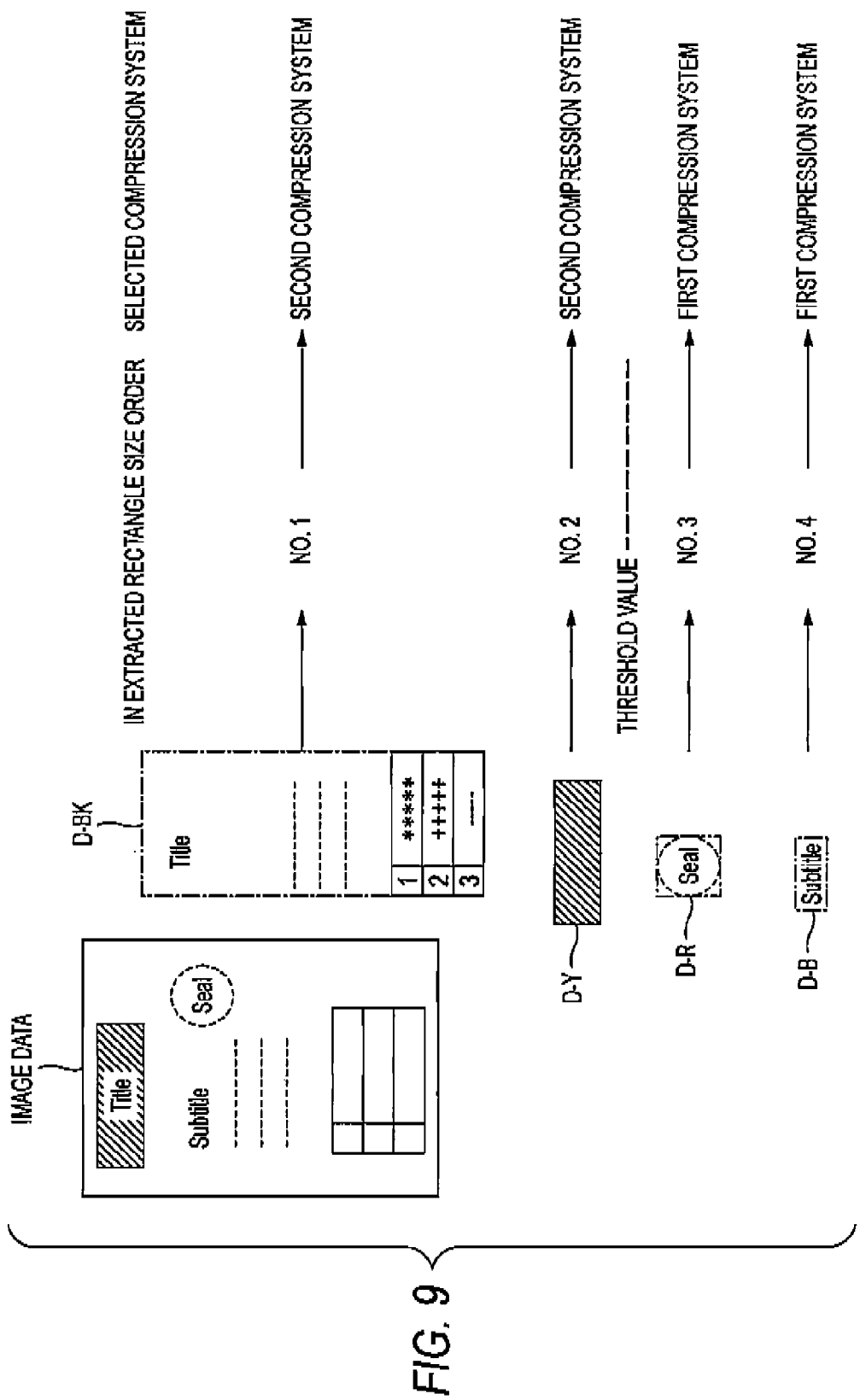
FIG. 9 is a drawing to describe a specific example (No. 3) of processing of the compression processing determination section.

FIG. 9 is a drawing to describe a specific example (No. 3) of processing of the compression processing determination section. The specific example is predicated on the configuration of the subtractive color processing section 22 shown in FIG. 2. The compression processing determination section 223 computes the size of a circumscribed rectangle of ON pixels or OFF pixels for each color about the data of layered structure for each representative color sent from the by-color separation processing section 222. The compression processing determination section 223 assigns a number to the data of layered structure in the descending order of the sizes of circumscribed rectangles.

In the example shown in FIG. 9, black layered structure data D-BK, yellow layered structure data D-Y, red layered structure data D-R, and blue layered structure data D-B are sent to the compression processing determination section 223 as the data of layered structure for each representative color obtained from image data.

The compression processing determination section 223 assigns a number to the layered structure data in the descending order of the sizes of circumscribed rectangles of ON pixels or OFF pixels indicating elements (character, chart, pattern, etc.,) contained in the layered structure data of each color. In the example, the black layered structure data D-BK becomes No. 1, the yellow layered structure data D-Y becomes No. 2, the red layered structure data D-R becomes No. 3, and the blue layered structure data D-B becomes No. 4.

Next, the compression processing determination section 223 determines the compression system of the layered structure data for each color using a preset number or size as a threshold value. In the example shown in FIG. 9, the order No. 2 is used as the threshold value and the different compression system is determined depending on whether the order number is greater than or equal to or is less than the threshold value.

Specifically, the compression system of each of the black layered structure data D-BK and the yellow layered structure data D-Y becoming greater than or equal to the threshold value is determined the second compression system (second compression processing section), and the compression system of each of the red layered structure data D-R and the blue layered structure data D-B becoming less than the threshold value is determined the first compression system (first compression processing section).

In the example, since the second compression system is JBIG2 and the first compression system is MMR, the black layered structure data D-BK and the yellow layered structure data D-Y becoming greater than or equal to the threshold value are compressed according to JBIG2 and the red layered structure data D-R and the blue layered structure data D-B becoming less than the threshold value are compressed according to MMR.

That is, the second compression system (JBIG2) which becomes high compressibility between the first and second compression systems is adopted for the layer where the circumscribed rectangle size of element is large because the file size for all layers becomes large. On the other hand, the first compression system (MMR) which becomes low compressibility between the first and second compression systems is adopted for the layer where the circumscribed rectangle size of element is small because the file size for all layers becomes small. Accordingly, the whole file size is lessened and the processing speed is increased.

SPECIFIC EXAMPLE (No. 4)

Figure 10:
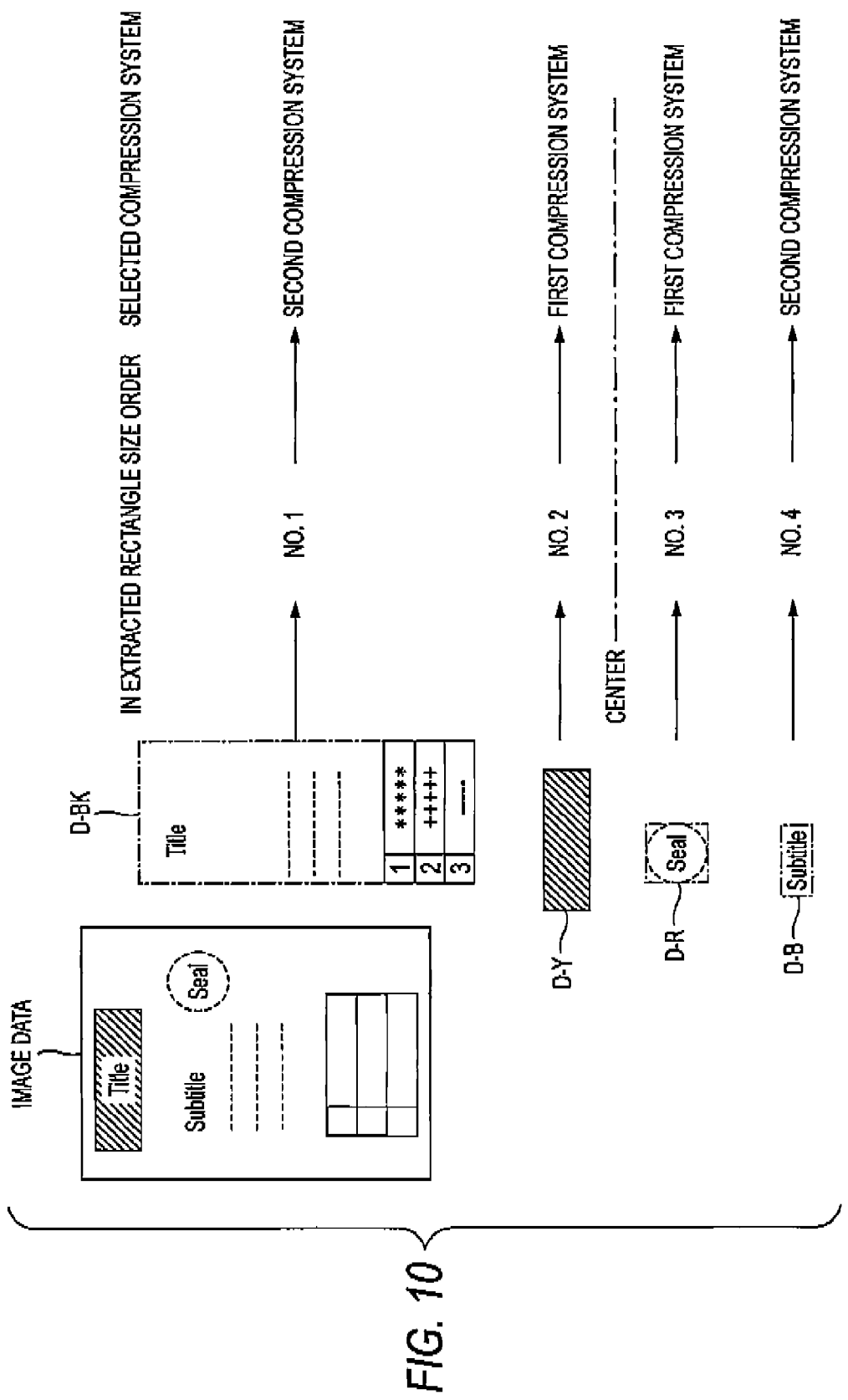
FIG. 10 is a drawing to describe a specific example (No. 4) of processing of the compression processing determination section.

FIG. 10 is a drawing to describe a specific example (No. 4) of processing of the compression processing determination section. The specific example is predicated on the configuration of the subtractive color processing section 22 shown in FIG. 2. The compression processing determination section 223 computes the size of a circumscribed rectangle of ON pixels or OFF pixels for each color about the data of layered structure for each representative color sent from the by-color separation processing section 222. The compression processing determination section 223 assigns a number to the data of layered structure in the descending order of the sizes of circumscribed rectangles.

In the example shown in FIG. 10, black layered structure data D-BK, yellow layered structure data D-Y, red layered structure data D-R, and blue layered structure data D-B are sent to the compression processing determination section 223 as the data of layered structure for each representative color obtained from image data.

The compression processing determination section 223 assigns a number to the layered structure data in the descending order of the sizes of circumscribed rectangles of ON pixels or OFF pixels indicating elements (character, chart, pattern, etc.,) contained in the layered structure data of each color. In the example, the black layered structure data D-BK becomes No. 1, the yellow layered structure data D-Y becomes No. 2, the red layered structure data D-R becomes No. 3, and the blue layered structure data D-B becomes No. 4.

Next, the compression processing determination section 223 determines the compression system for each color so that different compression systems are adopted alternately in each of the descending order and the ascending order of the circumscribed rectangle sizes. In the example shown in FIG. 10, the order No. 2 is used as the threshold value and the different compression system is determined depending on whether the order number is greater than or equal to or is less than the threshold value.

In the example, the second compression system and the first compression system are selected in this order from the larger side of the circumscribed rectangle size to the center, namely, about No. 1 and No. 2 of the circumscribed rectangle size. On the other hand, the second compression system and the first compression system are selected in this order, the same alternating order as that described above from the smaller side of the circumscribed rectangle size to the center, namely, about No. 4 and No. 3 of the circumscribed rectangle size.

Therefore, in the example, since the second compression system is JBIG2 and the first compression system is MMR, the black layered structure data D-BK with circumscribed rectangle size No. 1 is compressed according to JBIG2, the yellow layered structure data D-Y with circumscribed rectangle size No. 2 is compressed according to MMR, the red layered structure data D-R with circumscribed rectangle size No. 3 is compressed according to MMR, and the blue layered structure data D-B with circumscribed rectangle size No. 4 is compressed according to JBIG2.

Assuming that there are N layers (where N is a positive integer) of layered structure data for each color and there are No. 1 to No. N in the descending order of the circumscribed rectangle sizes, compression system assignment is as follows: The layered structure data with No. 1, No. N, No. 3, No. (N−2), . . . becomes the second compression system and the layered structure data with No. 2, No. (N−1), No. 4, No. (N−3), . . . becomes the first compression system.

The compression system assignment method described above is one example and any assignment method may be adopted if the first and second compression systems are not applied to one side with respect to the order of the circumscribed rectangle sizes. Accordingly, the compression processing determination section 223 determines the compression system without performing special determination processing and the whole file size is lessened equally and the processing speed is increased.

SPECIFIC EXAMPLE (No. 5)

Figure 11:
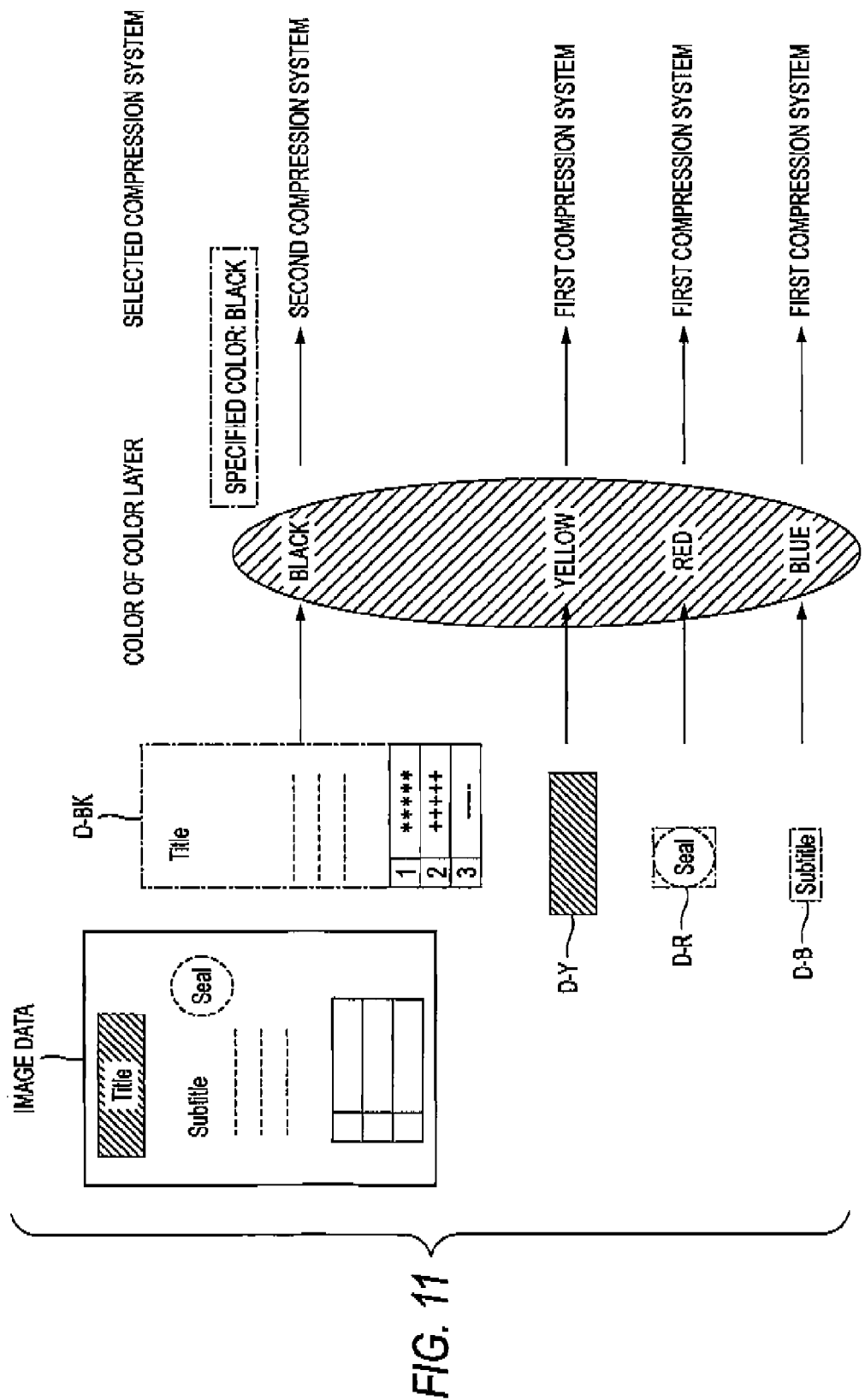
FIG. 11 is a drawing to describe a specific example (No. 5) of processing of the compression processing determination section.

FIG. 11 is a drawing to describe a specific example (No. 5) of processing of the compression processing determination section. The specific example is predicated on the configuration of the subtractive color processing section 22 shown in FIG. 2. The compression processing determination section 223 determines the compression system in response to each color about the data of layered structure for each representative color sent from the by-color separation processing section 222.

In the example shown in FIG. 11, black layered structure data D-BK, yellow layered structure data D-Y, red layered structure data D-R, and blue layered structure data D-B are sent to the compression processing determination section 223 as the data of layered structure for each representative color obtained from image data.

The compression processing determination section 223 determines the compression system of layered structure data for each color based on setting of determination of the compression system for each preset color. In the example shown in FIG. 11, setting is made so as to select the second compression system for the color specified as character color (for example, black) and setting is made so as to select the first compression system for other colors.

Therefore, the compression system of the black layered structure data D-BK is determined the second compression system (second compression processing section) and the compression system of each of the yellow layered structure data D-Y, the red layered structure data D-R, and the blue layered structure data D-B is determined the first compression system (first compression processing section).

In the example, since the second compression system is JBIG2 and the first compression system is MMR, the black layered structure data D-BK is compressed according to JBIG2 and the yellow layered structure data D-Y, the red layered structure data D-R, and the blue layered structure data D-B are compressed according to MMR.

In the example, the color often used for documents is specified, whereby the second compression system (JBIG2) which becomes high compressibility between the first and second compression systems is adopted for the layered structure data of color where the file size becomes large for the whole. On the other hand, the first compression system (MMR) which becomes low compressibility between the first and second compression systems is adopted for the layered structure data of color where the file size for all layers is small. Accordingly, the whole file size is lessened and the processing speed is increased. The specified color adopting the second compression system is not limited to black; any other specification method of a preset color (or preset colors), a color such that the circumscribed rectangle size becomes the largest, or the like may be used.

<6. Configuration of Another Image Processing Apparatus>

Figure 12:
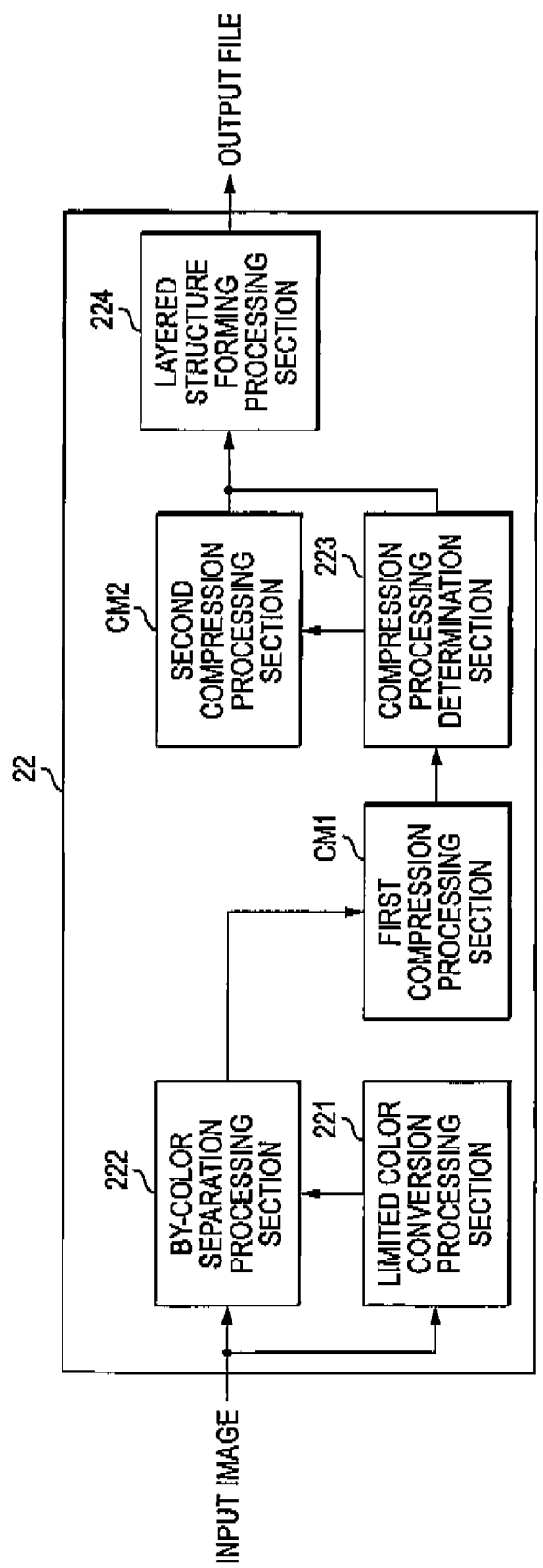
FIG. 12 is a block diagram to describe the configuration of a subtractive color processing section of an image processing apparatus according to another embodiment of the invention.

FIG. 12 is a block diagram to describe the configuration of a subtractive color processing section of an image processing apparatus according to another embodiment of the invention. A subtractive color processing section 22 includes a limited color conversion processing section 221, a by-color separation processing section 222, a compression processing determination section 223, a layered structure forming processing section 224, and plural compression processing sections (in the example in FIG. 12, a first compression processing section CM1 and a second compression processing section CM2).

The limited color conversion processing section 221 extracts plural pieces of color information making up an image from an input image (electronic data of the image sent from the expansion section 21 shown in FIG. 1) and converts the plural pieces of color information into color information representing specific color to which the extracted color information belongs. In the following description, "color" means a color represented by color information. The details of the limited color conversion processing section 221 are similar to those described above with reference to FIGS. 3 to 5.

The by-color separation processing section 222 performs processing of separating the post-converted data converted into plural colors by the limited color conversion processing section 221 to image data for each color. The details of the by-color separation processing section 222 are similar to those described above with reference to FIGS. 5 and 6.

The compression processing determination section 223 determines whether or not to compress data according to a second compression system having higher compressibility than a first compression system according to the characteristic of image data (compression size and compression processing time) for each color compressed by the first compression processing section CM1 for each color.

The first compression processing section CM1 performs compression processing for each color according to the first compression system about image data for each color output from the by-color separation processing section 222. In the embodiment, compression processing according to the first compression system is once performed all the image data for each color.

The second compression processing section CM2 is a section for performing compression processing according to the second compression system having higher compressibility than the first compression system. The second compression processing section CM2 performs compression processing of only the image data of the color determined to be compressed by the compression processing determination section 223.

The layered structure forming processing section 229 performs processing of collecting image data by color compressed by the first compression processing section CM1 and the second compression processing section CM2 into one file for output. The output file is once stored in the second storage section M2 shown in FIG. 1 and then is sent through a network.

<7. Specific Examples of Processing of Compression Processing Determination Section According to Another Configuration>

Specific examples of processing of the compression processing determination section according to the configuration shown in FIG. 12 will be discussed below: The specific examples described here take the case where the two compression processing sections of the first compression processing section CM1 and the second compression processing section CM2 are used as plural compression processing sections and MMR (Modified Modified Read) is used as the compression system of the first compression processing section CM1 and JBIG2 (Joint Bi-level Image Experts Group 2) to provide higher compression than that of the compression system of the first compression processing section CM1 is used as the compression system of the second compression processing section CM2.

SPECIFIC EXAMPLE (No. 6)

Figure 13:
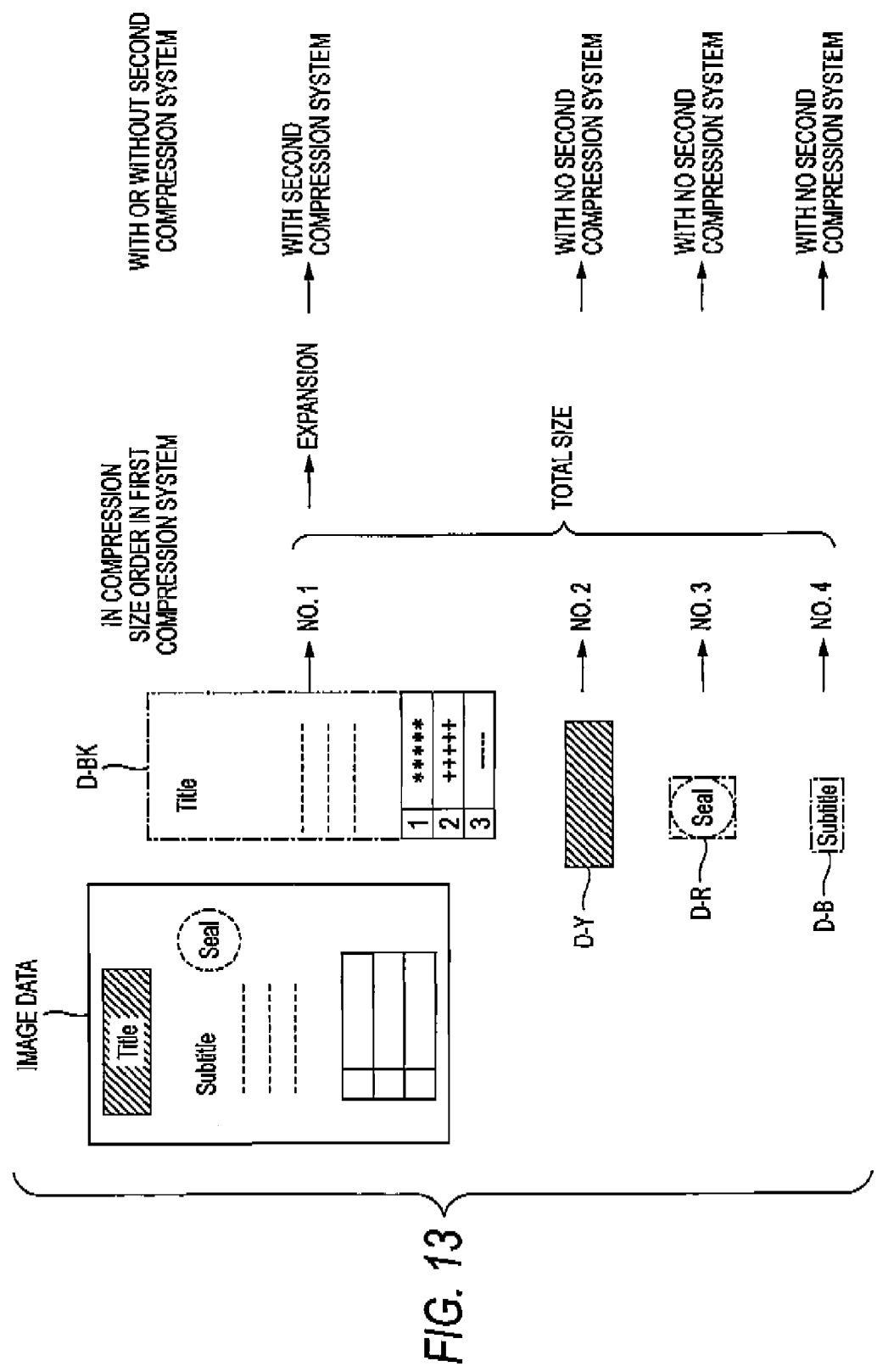
FIG. 13 is a drawing to describe a specific example (No. 6) of processing of a compression processing determination section.

FIG. 13 is a drawing to describe a specific example (No. 6) of processing of the compression processing determination section. The compression processing determination section 223 (see FIG. 12) calculates the file size after data is compressed according to the first compression system by the first compression processing section CM1 (see FIG. 12) about the data of layered structure for each representative color sent from the by-color separation processing section 222 (see FIG. 12). The compression processing determination section 223 assigns a number to the data of layered structure in the descending order of the file sizes.

In the example shown in FIG. 13, black layered structure data D-BK, yellow layered structure data D-Y, red layered structure data D-R, and blue layered structure data D-B are compressed according to the first compression system by the first compression processing section CM1 as the data of layered structure for each representative color obtained from image data.

The compression processing determination section 223 assigns a number to the layered structure data in the descending order of the files sizes after compression of the image data of each color compressed according to the first compression system. In the example, the black layered structure data D-BK becomes No. 1, the yellow layered structure data D-Y becomes No. 2, the red layered structure data D-R becomes No. 3, and the blue layered structure data D-B becomes No. 4.

Next, the compression processing determination section 223 determines whether or not to compress data according to the second compression system about the layered structure data for each color using a preset number or the file size after compression as a threshold value. In the example shown in FIG. 13, the order No. 1 is used as the threshold value and whether or not to compress data according to the second compression system is determined depending on whether the order number is greater than or equal to or is less than the threshold value.

Specifically, the determination is as follows: The black layered structure data D-BK becoming greater than or equal to the threshold value is compressed according to the second compression system (second compression processing section) and the yellow layered structure data D-Y, the red layered structure data D-R, and the blue layered structure data D-B becoming less than the threshold value are not compressed according to the second compression system and are output as they are compressed in the first compression system (first compression processing section).

In the example, since the second compression system is JBIG2 and the first compression system is MMR, the black layered structure data D-BK becoming greater than or equal to the threshold value is once expanded and then the post-expanded image data is sent to the second compression processing section. The second compression processing section compresses the image data according to the second compression system (JBIG2) having higher compressibility than the first compression system. On the other hand, the yellow layered structure data D-Y, the red layered structure data D-R, and the blue layered structure data D-B becoming less than the threshold value are not compressed according to the second compression system and are output as they are compressed in the first compression system (MMR).

That is, of the image data of each color compressed according to the first compression system (MMR), each layer where the file size after compression for all layers becomes large is compressed according to the second compression system (JBIG2) to provide higher compression than the first compression system (MMR) and is output. On the other hand, of the image data of each color compressed according to the first compression system (MMR), each layer where the file size for all layers is small is not compressed according to the second compression system and is output as it is compressed in the first compression system (MMR). Accordingly, while the file size is brought close to any desired file size as the whole file, the processing speed is increased.

SPECIFIC EXAMPLE (No. 7)

Figure 14:
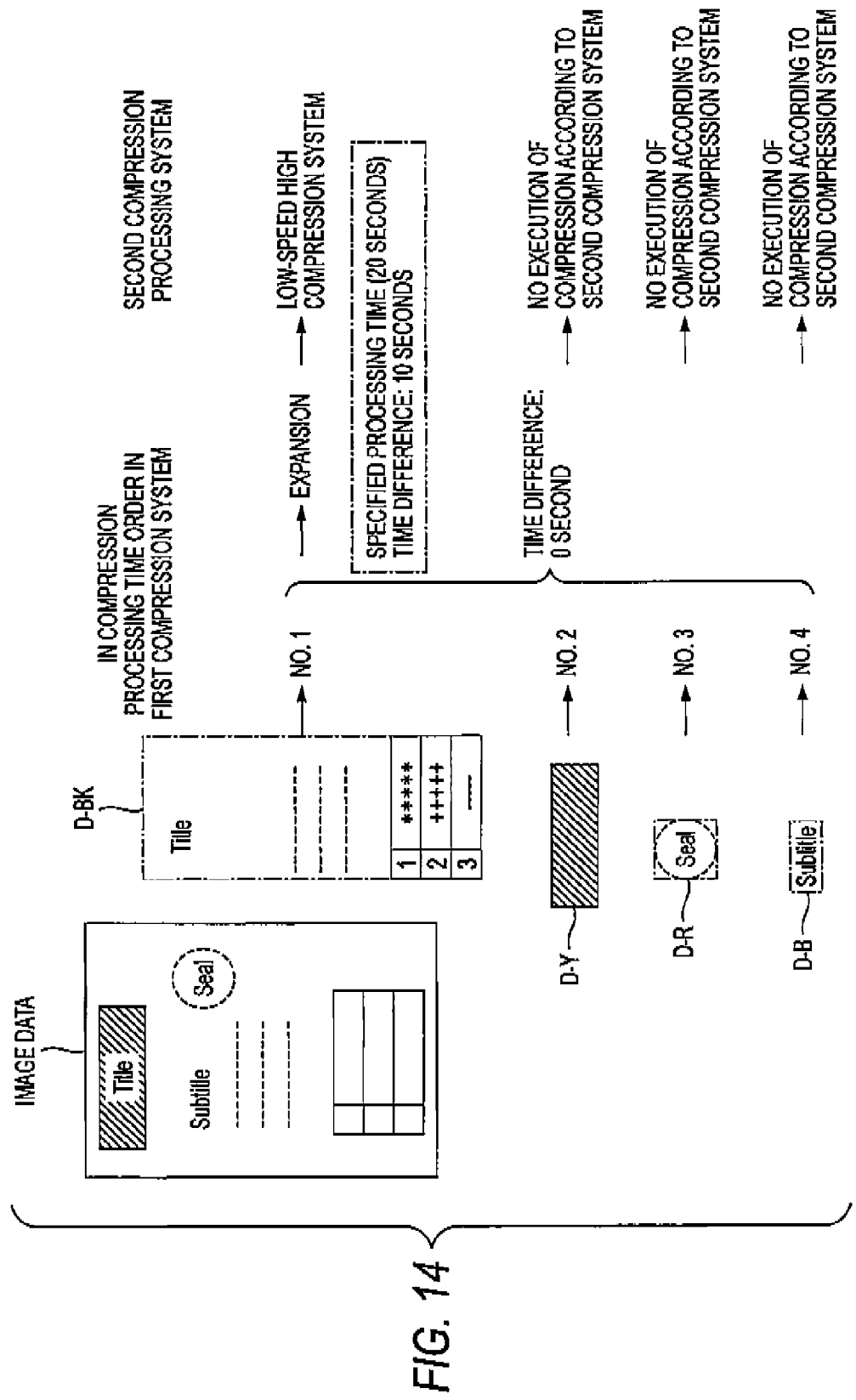
FIG. 14 is a drawing to describe a specific example (No. 7) of processing of the compression processing determination section.

FIG. 14 is a drawing to describe a specific example (No. 7) of processing of the compression processing determination section. The compression processing determination section 223 (see FIG. 12) calculates the compression processing time in compressing according to the first compression system by the first compression processing section CM1 (see FIG. 12) about the data of layered structure for each representative color sent from the by-color separation processing section 222 (see FIG. 12). The compression processing determination section 223 assigns a number to the data of layered structure in the descending order of the compression processing times.

In the example shown in FIG. 14, black layered structure data D-BK, yellow layered structure data D-Y, red layered structure data D-R, and blue layered structure data D-B are compressed according to the first compression system by the first compression processing section CM1 as the data of layered structure for each representative color obtained from image data.

The compression processing determination section 223 assigns a number to the layered structure data in the descending order of the processing times in compression about the image data of each color compressed according to the first compression system. In the example, the black layered structure data D-BK becomes No. 1, the yellow layered structure data D-Y becomes No. 2, the red layered structure data D-R becomes No. 3, and the blue layered structure data D-B becomes No. 4.

Next, the compression processing determination section 223 determines whether or not to compress data according to the second compression system about the layered structure data for each color using a preset number or the compression processing time (the processing time itself or the difference from preset time) as a threshold value. In the example shown in FIG. 14, the difference for example, 10 seconds) from the preset time (for example, 20 seconds) is used as the threshold value and whether or not to compress data according to the second compression system is determined depending on whether the processing time is greater than or equal to or is less than the threshold value.

Specifically, the determination is as follows: The black layered structure data D-BK becoming greater than or equal to the threshold value is compressed according to the second compression system (second compression processing section) and the yellow layered structure data D-Y, the red layered structure data D-R, and the blue layered structure data D-B becoming less than the threshold value are not compressed according to the second compression system and are output as they are compressed in the first compression system (first compression processing section).

In the example, since the second compression system is JBIG2 and the first compression system is MMR, the black layered structure data D-BK becoming greater than or equal to the threshold value is once expanded and then the post-expanded image data is sent to the second compression processing section. The second compression processing section compresses the image data according to the second compression system (JBIG2) having higher compressibility than the first compression system. On the other hand, the yellow layered structure data D-Y, the red layered structure data D-R, and the blue layered structure data D-B becoming less than the threshold value are not compressed according to the second compression system and are output as they are compressed in the first compression system (MMR).

That is, of the image data of each color compressed according to the first compression system (MMR), each layer where the compression processing time for all layers becomes large is compressed according to the second compression system (JBIG2) to provide higher compression than the first compression system (MMR) and is output. On the other hand, of the image data of each color compressed according to the first compression system (MMR), each layer where the compression processing time for all layers is small is not compressed according to the second compression system and is output as it is compressed in the first compression system (MMR). Accordingly, while the compression processing time is brought close to any desired compression processing time as the whole file, the compressibility of the file size is enhanced.

In every specific example described above, the two compression processing sections of the first compression processing section and the second compression processing section are used, but compression processing sections using three or more different compression systems may be used. In this case, more than one threshold value in each of the specific examples is set and applying of each compression system is determined according to each threshold value.

<8. Image Processing Program>

Next, an image processing program according to the embodiment will be discussed. The image processing program according to the embodiment has steps that a computer is caused to execute. The computer includes a computation section for executing the image processing program according to the embodiment, a storage section for storing programs and various pieces of data, and an input/output section. The computer may be not only an electronic computer such as a personal computer, but also be built in an electronic device that can handle information, such as a video recording and playing apparatus or a mobile terminal. The image processing program of the embodiment is recorded on a record medium of a CD-ROM, etc., or is distributed through the network.

[Hardware Configuration]

Figure 15:
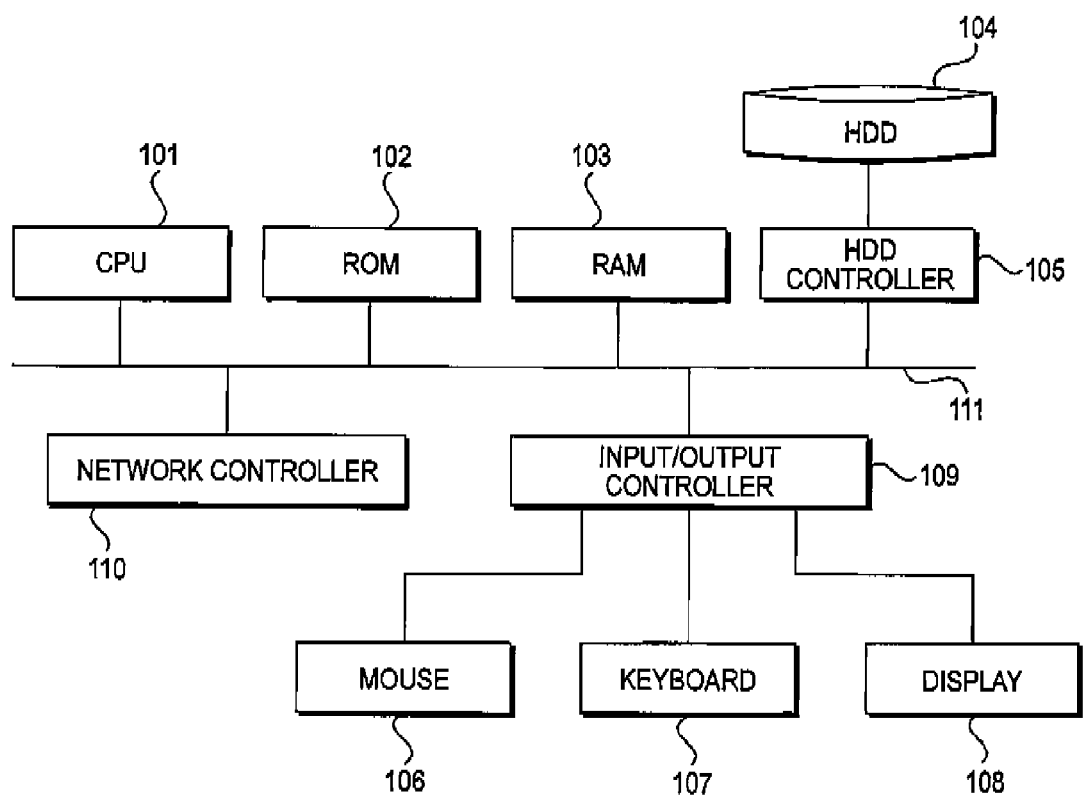
FIG. 15 is a block diagram to show the hardware configuration of a computer for executing an image processing program.

FIG. 15 is a block diagram to show the hardware configuration of the computer for executing the image processing program. As the hardware configuration of the computer, a CPU (Central Processing Unit) 101, ROM (Read-Only Memory) 102, RAM (Random Access Memory) 103, an HDD (Hard Disk Drive) 104, an HDD controller 105, a mouse 106, a keyboard 107, a display 108, an input/output controller 109, and a network controller 110 are connected by a bus 111.

The image processing program of the embodiment described later is stored in the HDD 4 in the hardware configuration and is read into the RAM 3 for execution and then is executed by the CPU 1.

[Flowchart: Program (No. 1) Corresponding to Subtractive Color Processing Section]

Figure 16:
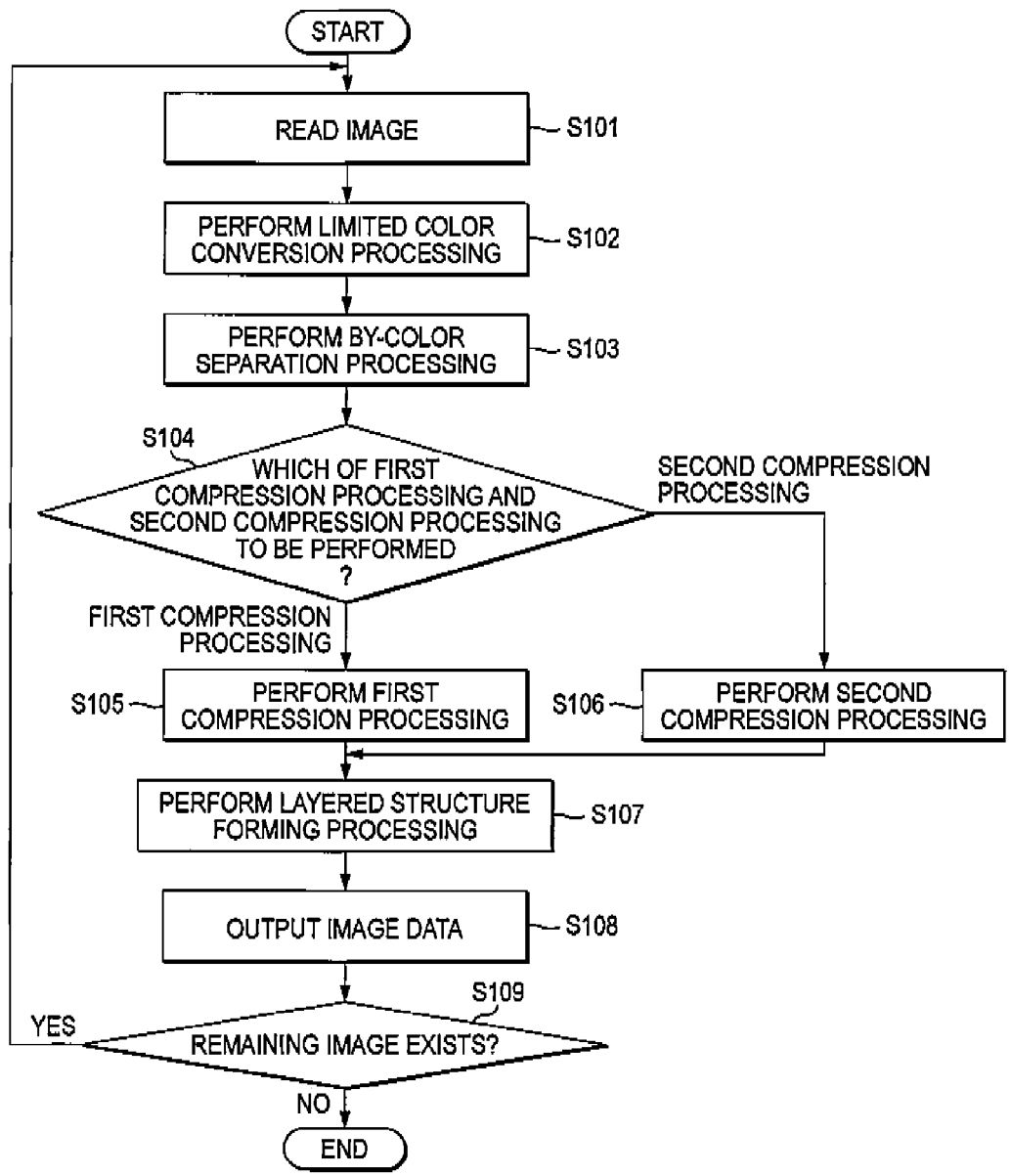
FIG. 16 is a flowchart to describe a flow of a program (No. 1) corresponding to a subtractive color processing section.

FIG. 16 is a flowchart to describe a flow of a program (No. 1) corresponding to a subtractive color processing section. Here, a flow of processing predicated on the configuration of the subtractive color processing section 22 shown in FIG. 2 is shown. To begin with, image data is read (step S101). Next, the limited color conversion processing section 221 performs limited color conversion processing for the read image data (step S102). That is, it extracts plural pieces of color information making up the image data and converts the plural pieces of color information into color information representing specific color to which the color information belongs.

Next, the by-color separation processing section 222 performs by-color separation processing (step S103). In the by-color separation processing, the image data for each specific color provided by the limited color conversion processing section 221 is separated into layered structure data for each color.

Next, the compression processing determination section 223 performs compression processing determination (step S104). In the compression processing determination, which of the first compression system and the second compression system is to be used to compress data is determined in response to the characteristic about layered structure data for each color as in the specific examples (No. 1 to No. 5) described above.

The layered structure data determined to be compressed according to the first compression system is sent to the first compression processing section CM1, which then performs compression processing according to the first compression system (step S105). On the other hand, the layered structure data determined to be compressed according to the second compression system is sent to the second compression processing section CM2, which then performs compression processing according to the second compression system (step S106).

Next, the layered structure forming processing section 224 performs layered structure forming processing (step S107).

In this processing, for the layered structure data of each color, the post-compressed data subjected to the first or second compression processing is collected into one file. Then, the image data is output (step S108). Whether or not a remaining image exists is determined (step S109). If a remaining image exists, the process returns to step S101 and the later processing is repeated. If no remaining image exists, the processing is terminated.

[Flowchart: Program (No. 2) Corresponding to Subtractive Color Processing Section]

Figure 17:
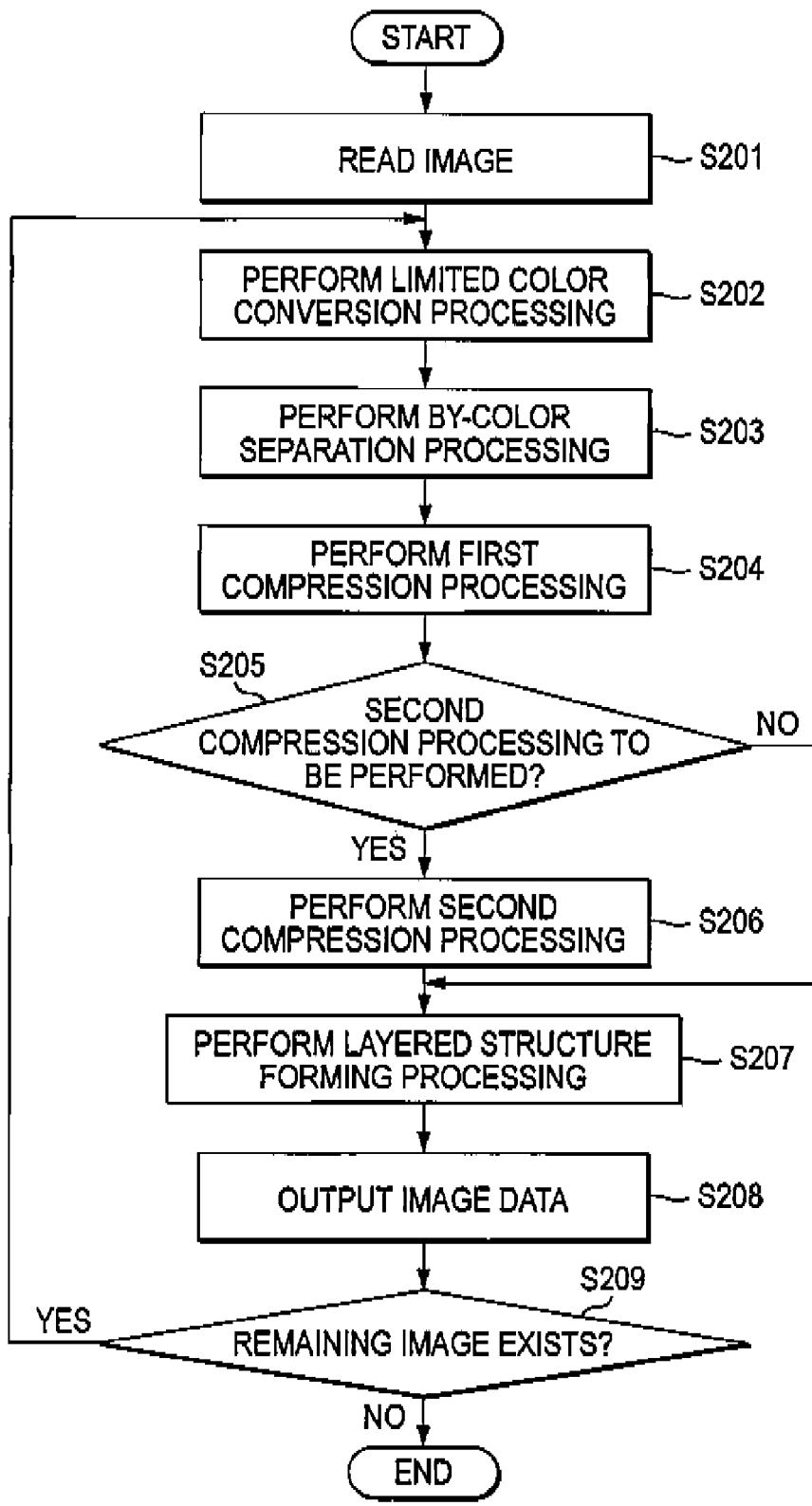
FIG. 17 is a flowchart to describe a flow of a program (No. 2) corresponding to a subtractive color processing section.

FIG. 17 is a flowchart to describe a flow of a program (No, 2) corresponding to a subtractive color processing section. Here, a flow of processing predicated on the configuration of the subtractive color processing section 22 shown in FIG. 12 is shown. To begin with, image data is read (step S201). Next, the limited color conversion processing section 221 performs limited color conversion processing for the read image data (step S202). That is, it extracts plural pieces of color information making up the image data and converts the plural pieces of color information into color information representing specific color to which the color information belongs.

Next, the by-color separation processing section 222 performs by-color separation processing (step S203). In the by-color separation processing, the image data for each specific color provided by the limited color conversion processing section 221 is separated into layered structure data for each color.

Next, for layered structure data of all colors, compression processing according to the first compression system is performed for each color (step S204). Next, compression processing determination is executed (step S205). In the compression processing determination, whether or not to compress data according to the second compression system having higher compressibility than the first compression system is determined according to the characteristic in compressing the layered structure data for each color according to the first compression system (compression size and compression processing time) for each color as in the specific examples (No. 6 and No. 7) described above.

If it is determined that the data is to be compressed according to the second compression system, the layered structure data of the corresponding color is expanded and then compression processing is performed according to the second compression system (step S206). On the other hand, if it is determined that the data is not to be compressed according to the second compression system, the layered structure data of the corresponding color is output as it is (compressed in the first compression system).

Next, the layered structure forming processing section 224 performs layered structure forming processing (step S207). In this processing, for the layered structure data of each color, the post-compressed data subjected to the first or second compression processing is collected into one file. Then, the image data is output (step S208). Whether or not a remaining image exists is determined (step S209). If a remaining image exists, the process returns to step S201 and the later processing is repeated. If no remaining image exists, the processing is terminated.

<9. Compression Size and Processing Time According to the Embodiment>

FIG. 18 is a drawing to show an example of the compression size and the compression processing time of a file when the embodiment is applied. The example of the embodiment is the specific example (No. 1) described above, wherein only the layered structure data where the number of ON pixels is the largest is compressed according to JBIG2 and any other layered structure data is compressed according to MMR. For comparison purposes, the case where layered structure data of all colors is compressed according to JBIG2 and the case where layered structure data of all colors is compressed according to MMR, are shown.

When the embodiment is applied, the file size after compression is 43K bytes and the compression processing time is 0.68 seconds. On the other hand, if the layered structure data of all colors is compressed according to JBIG2, the file size after compression is 40K bytes and the compression processing time is 1.2 seconds. If the layered structure data of all colors is compressed according to MMR, the file size after compression is 60K bytes and the compression processing time is 0.09 seconds. Thus, the embodiment is applied, whereby a slight increase in the file size results as compared with the case where layered structure data of all colors is compressed according to JBIG2, and a slight increase in the processing time results as compared with the case where layered structure data of all colors is compressed according to MMR.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus, comprising:
   a limited color conversion processing section that extracts a plurality of pieces of color information constructing image information and converts the plurality of pieces of color information into color information representing specific colors to which each of the plurality of pieces of color information belongs;
   a by-color separation processing section that separates the image information containing the color information converted to represent the specific colors by the limited color conversion processing section for each of the specific colors;
   a compression determination section that determines a compression system for each color as to each of pieces of image information, said each of pieces of image information being separated by the by-color separation processing section for each of the specific colors;
   a compression processing section that compresses said each of pieces of image information for each of the specific colors according to the compression system for each color determined by the compression determination section; and
   a layered structure forming processing section that collectively outputs said each of pieces of image information for each of the specific colors compressed by the compression processing section.

2. The image processing apparatus according to claim 1, wherein the compression determination section determines the compression system for each color based on the number of ON pixels or OFF pixels of said each of pieces of image information for each of the specific colors.

3. The image processing apparatus according to claim 1, wherein the compression determination section determines the compression system for each color based on frequency of switch between ON and OFF pixels of said each of pieces of image information for each of the specific colors.

4. The image processing apparatus according to claim 1, wherein the compression determination section determines the compression system for each color based on a size of a circumscribed rectangle of ON pixels or OFF pixels of said each of pieces of image information for each of the specific colors.

5. The image processing apparatus according to claim 1, wherein the compression determination section determines the compression system for each color so that different compression systems are adopted alternately in each of a descending order and an ascending order of circumscribed rectangle sizes of ON pixels or OFF pixels of said each of pieces of image information for each of the specific colors.

6. The image processing apparatus according to claim 1, wherein the compression determination section determines the compression system based on a color of said each of pieces of image information for each of the specific colors.

7. An image processing apparatus, comprising:
a limited color conversion processing section that extracts a plurality of pieces of color information constructing image information and converts the plurality of pieces of color information into color information representing specific colors to which each of the plurality of pieces of color information belongs;
a by-color separation processing section that separates the image information containing the color information converted to represent the specific colors by the limited color conversion processing section for each of the specific color;
a first compression processing section that compresses each of pieces of image information according to a first determination system for each color, said each of pieces of image information being separated by the by-color separation processing section for each of the specific colors;
a compression determination section that determines whether or not to compress said each of pieces of image information compressed by the first compression processing section according to a second compression system for each color, the compression determination section determining based on a capacity of said each of pieces of image information for each of the specific color, wherein the second compression system has higher compressibility than the first compression system;
a second compression processing section that compresses pieces of image information for each of the specific colors determined to be compressed according to the second compression system by the compression determination section; and
a layered structure forming processing section that collectively outputs said each of pieces of image information for each of the specific color compressed by the first compression processing section, and said each of pieces of image information for each of the specific color compressed by the first compression processing section and the second compression processing section.

8. An image processing apparatus, comprising:
a limited color conversion processing section that extracts a plurality of pieces of color information constructing image information and converts the plurality of pieces of color information into color information representing specific colors to which each of the plurality of pieces of color information belongs;
a by-color separation processing section that separates the image information containing the color information converted to represent the specific colors by the limited color conversion processing section for each of the specific color;
a first compression processing section that compresses each of pieces of image information according to a first determination system for each color, said each of pieces of image information being separated by the by-color separation processing section for each of the specific colors;
a compression determination section that determines whether or not to compress said each of pieces of image information compressed by the first compression processing section according to a second compression system for each color, the compression determination section determining based on a compression processing time of said each of pieces of image information for each of the specific color, wherein the second compression system has higher compressibility than the first compression system;
a second compression processing section that compresses pieces of image information for each of the specific colors determined to be compressed according to the second compression system by the compression determination section; and
a layered structure forming processing section that collectively outputs said each of pieces of image information for each of the specific color compressed by the first compression processing section, and said each of pieces of image information for each of the specific color compressed by the first compression processing section and the second compression processing section.

9. A computer readable medium storing a program causing a computer to execute a process for image processing, the process comprising:
extracting a plurality of pieces of color information constructing image information;
converting the plurality of pieces of color information into color information representing specific colors to which each of the plurality of pieces of color information belongs;
separating the image information containing the color information converted to represent the specific colors for each of the specific colors;
determining a compression system for each color as to each of pieces of image information separated for each of the specific colors;
compressing said each of pieces of image information for each of the specific colors according to the compression system for each color determined; and
collectively outputting said each of pieces of image information for each of the specific colors compressed.

10. A computer readable medium storing a program causing a computer to execute a process for image processing, the process comprising:
extracting a plurality of pieces of color information constructing image information;
converting the plurality of pieces of color information into color information representing specific colors to which each of the plurality of pieces of color information belongs;

separating the image information containing the color information converted to represent the specific colors for each of the specific color;

compressing each of pieces of image information separated for each of the specific colors, according to a first determination system for each color;

determining whether or not to compress said each of pieces of image information compressed, according to a second compression system for each color based on a capacity of said each of pieces of image information for each of the specific color, wherein the second compression system has higher compressibility than the first compression system;

compressing pieces of image information for each of the specific colors determined to be compressed according to the second compression system; and collectively outputting said each of pieces of image information for each of the specific color compressed according to the first compression system, and said each of pieces of image information for each of the specific color compressed according to the first compression system and the second compression system.

11. A computer readable medium storing a program causing a computer to execute a process for image processing, the process comprising:

extracting a plurality of pieces of color information constructing image information;

converting the plurality of pieces of color information into color information representing specific colors to which each of the plurality of pieces of color information belongs;

separating the image information containing the color information converted to represent the specific colors for each of the specific color;

compressing each of pieces of image information separated for each of the specific colors according to a first determination system for each color;

determining whether or not to compress said each of pieces of image information compressed for each color, according to a second compression system based on a compression processing time of said each of pieces of image information for each of the specific color, wherein the second compression system has higher compressibility than the first compression system;

compressing pieces of image information for each of the specific colors determined to be compressed according to the second compression system; and collectively outputting said each of pieces of image information for each of the specific color compressed according to the first compression system, and said each of pieces of image information for each of the specific color compressed according to the first compression system and the second compression system.

* * * * *